(12) United States Patent
Ying et al.

(10) Patent No.: US 6,535,402 B1
(45) Date of Patent: Mar. 18, 2003

(54) ADAPTIVE COMPENSATION OF DEAD TIME FOR INVERTER AND CONVERTER

(75) Inventors: Jianping Ying, Neihu Taipei (TW); Zhigan Wu, Neihu Taipei (TW); Jin Wang, Neihu Taipei (TW)

(73) Assignee: Delta Electronics Inc., Taoyuan (TW)

( * ) Notice: Subject to any disclaimer, the term of this patent is extended or adjusted under 35 U.S.C. 154(b) by 0 days.

(21) Appl. No.: 10/194,677

(22) Filed: Jul. 12, 2002

(51) Int. Cl.[7] .......................... H02M 1/12; H02M 1/14
(52) U.S. Cl. ........................................ 363/41; 363/134
(58) Field of Search .............................. 363/41, 98, 132, 363/134

(56) References Cited

U.S. PATENT DOCUMENTS

| | | | | |
|---|---|---|---|---|
| 5,253,155 A | * | 10/1993 | Yamamoto | 363/71 |
| 5,764,024 A | * | 6/1998 | Wilson | 318/805 |
| 5,852,554 A | * | 12/1998 | Yamamoto | 363/71 |
| 5,930,132 A | * | 7/1999 | Watanabe et al. | 363/56.04 |
| 6,021,058 A | * | 2/2000 | Yasohara et al. | 363/98 |
| 6,469,916 B1 | * | 10/2002 | Kerkman et al. | 363/41 |

* cited by examiner

*Primary Examiner*—Bao Q. Vu

(57) ABSTRACT

The invention relates to the compensation of dead time effect in electronic appliances such as inverters or converters having one or more legs with two complementary switches. The invented method mainly includes following steps providing an initial pulse width modulated (PWM) reference, providing a bias current and detecting the bias current crossing points, providing a dead time compensation signal which is adjusted responsive to the crossing points, and adding the dead time compensation signal to the PWM reference. Hence an adaptive compensation is accomplished independent of types of switching elements and load conditions. A high reliable circuit with low cost is further included as a preferred embodiment of bias current crossing points detection.

14 Claims, 12 Drawing Sheets

ADAPTIVE COMPENSATION OF DEAD TIME FOR INVERTER AND CONVERTER

FIELD OF THE INVENTION

The present invention relates to an apparatus and a method for compensating the voltage error caused by dead time of switching elements which are used in electronic appliances such as converters, inverters or motors, and more particularly to an apparatus and a method for compensating the voltage error and the output current distortion caused by dead time of switching elements in a PWM converter or PWM inverter.

BACKGROUND OF THE INVENTION

FIG. 1 illustrates a circuit configuration of an inverter which is constituted by semiconductor switching elements. More specially, the inverter is formed by phase bridges which are constituted by series-connecting one switching element in parallel with a reverse recovery diode and another switching element in parallel with another reverse recovery diode. The load is connected to the node of the series connection which defines the output terminal of the inverter.

It is well known that a typical semiconductor switching element has an intrinsic delay time interval from the receipt of an on or off gate drive signal to the starting up of its switching action. The action of the switching element is turning on normally faster than turning off. Also, the duration of action of a gate drive circuit depends on its characteristics. Accordingly, if one of the two switching elements in the upper or lower arm of a phase bridge is turned off and the other switching element is turned on without giving a delay simultaneously, a short circuit may be produced. To prevent the short circuit of the power supply in pulse width modulated (PWM) voltage inverters or converters, the gate drive signal is preset with a dead time which is determined under the consideration of differences between the delays that are intrinsic to the elements and circuits. Therefore, the dead time is necessary to prevent the short circuit of the power supply in pulse width modulated (PWM) voltage inverters or converters resulting in output deviations. Although individually small, when accumulated over an operating cycle, the voltage deviations are sufficient to distort the applied PWM signal.

Actually, the dead time causes an error voltage between the command voltage and the actual output voltage, thereby resulting in disadvantages such as current distortion and torque ripple. For simplicity, the effects of dead time can best be examined from one phase of an inverter, e.g. phase U.

Referring to FIGS. 1 and 2, $PWM_u$ is the PWM command signal without the dead time. $PWM_1$ and $PWM_4$ are the actual gate driver signals of switching elements $T_1$ and $T_4$ with the dead time $T_d$ inserted respectively. The inverter output voltage $U_{UO}$ is the voltage of U-phase output with reference to the neutral 'O' which is an imaginary mid-point of the DC bus. The positive direction of phase currents is defined in FIGS. 1 and 2. Assuming $i_u>0$, after $PWM_1$ resets, in the period of dead time, both $T_1$ and $T_4$ are non-conductive. However, due to the inductive load, the output current is continuous. It then flows through the freewheeling diode $D_4$ and the negative DC bus voltage is connected to the output. So the terminal U has substantially the same potential as the negative terminal of the DC bus. Likewise, when the output current $i_u$ is flowing into the inverter, i.e. $i_u<0$, after PWM4 resets, in the period of dead time, the output current flows through the freewheeling diode $D_1$ and the terminal presents the positive voltage. It can be thus known that the output voltage is determined by the direction of the output current rather than the control signals of the switching elements during the dead time period.

The $U_{error}$, as shown in FIG. 2, illustrates these resultant deviation voltage pulses caused by the dead time. Assuming the switching elements are ideal, that is, both voltage drop and switching times are neglected, all these deviation pulses have the same height of $U_d$ and the same width of $T_d$. These deviation voltage pulses due to dead time are opposite to the current in either direction. As a result, the output current magnitude is reduced, regardless of its polarity.

Many industrial approaches for compensating this inevitable dead time have been suggested in PWM techniques. Most of them are based on the average value theory in which the error is averaged over an operating cycle and then added to a command voltage. Contrarily, the pulse based consideration in the dead time compensation method is also suited. Those pulsed-based methods provide more accurate compensation but increase the burden of the processor.

A conventional dead time compensation method will be described with reference to FIG. 3. FIG. 3 shows a flowchart for calculating a compensating voltage $V_{comp}$ so as to compensate the deviation voltage in accordance with the dead time. A current detector detects (Step S1) the output current $i_u$ and the controller judges (Step S2) the polarity of the detected current $i_u$. Here, if the value of the detected current is positive, a compensating voltage $V_{comp}$ for compensating the voltage error according to dead time is set as a predetermined positive value (Step S3). If the value of the detected current remains negative, the compensation voltage $V_{comp}$ is set (step S4) as a predetermined negative value. Next, by adding the compensation voltage $V_{comp}$ to a command voltage $V_{cmd}$, there is obtained (Step S5) a new compensation voltage $V'_{cmd}$.

Whereas, when the polarity of the current $i_u$ is judged as negative, the command voltage $V'_{cmd}$ is obtained by subtracting the dead time compensating voltage $V_{comp}$ of the inverter. When the polarity of the current $i_u$ is judged as positive, the command voltage $V'_{cmd}$ is obtained by adding the dead time compensating voltage $V_{comp}$ of the inverter.

However, as the current magnitude is small around current zero crossing point (ZCP), the noise and the transient caused by the PWM signal are added onto the little current signal. This makes it difficult for the current detector to detect current direction precisely, and the dead time compensation voltage is not in step with the actual current direction. As a result, the current distortion becomes worse.

As aforementioned, the dead time effects are analyzed on the assumption that the delay time of the switching elements is neglected. This assumption is reasonable when the output current is large but not the case that the output current is small especially around ZCP. FIG. 4 illustrates the effect of turning off time of switching elements on the output voltage, where part a) is the ideal PWM signal without dead time inserted, and part b) and c) are the actual PWM signal with the dead time inserted corresponding to the upper and lower switching elements respectively. $T_d$ means the inserted dead time. The bold solid line in part d) presents the case of the high positive output current, and the dashed line presents the case of the low positive output current. For the high positive current, the induction of motor quickly drives $U_{uo}$ to a low voltage during the dead time interval. However for a low positive current, during the dead time interval, the inductance of the motor has difficulty to reduce $U_{uo}$ due to the interaction with the large $T_{off}$ as well as the parasitic inductance and the capacitance of the system. Thus the high voltage $U_{uo}$ decays slowly during the dead time interval. Consequently, the above foresaid deviation voltage pulses come to be shortened. As a result, the voltage error caused by the dead time is lightened, and in another word, the dead time is partly compensated automatically. When the positive current is small enough, $U_{uo}$ may come to its utmost which is illustrated as the highest dashed line in part d) and the above foresaid deviation voltage pulses will be zero. As a result, the width of the output voltage $U_{uo}$ equals to that of the ideal command PWM which is clearly illustrated in parts a) and d) $T_a=T_b$. This means that dead time is fully compensated automatically. Likewise for a negative current, $U_{uo}$ increasing slowly as the dashed line illustrated in part e) and the deviation voltage caused by dead time reduces gradually as current decreasing.

The above analysis is based on the assumption that the output current does not change its direction in one PWM cycle. Actually, there is similar phenomenon as the current direction continually alternates in one or more sequential PWM cycles, which is called multi-ZCP. There are several situations of multi-ZCP. For simplicity, only the typical one is described as following.

As illustrated in FIG. 5, the output current is small. Accordingly, $T_{off}$ is large and cannot be neglected. Like the process described above, in the interval labeled as $T_x$, from the instant of $PWM_1$ falling, the output voltage $U_{uo}$ slowly goes to a low level as the dashed line illustrated. With the decreasing of the output current, $U_{uo}$ will go along the upper dashed line, and may reach the utmost as the level dashed line. Similar operations are performed when in the next dead time labeled as $T_y$. The average width of $U_{uo}$ can be illustrated as $T_b$. Hence $T_a=T_b$, that is to say, the width of the output voltage $U_{uo}$ equals to that of the ideal command PWM. Accordingly, the dead time is compensated automatically.

It can be seen that in one output current cycle, the deviation voltage is not of the same effect. When the output current is large, the deviation caused by dead time is relatively large, and when the output current is small, the deviation caused by dead time is relatively small. The current flatter around current zero point, which is illustrated in FIG. 6, is just caused by this deviation voltage.

It is therefore attempted by the applicant to deal with the above situation encountered with the prior art.

SUMMARY OF THE INVENTION

It is therefore an object of this invention to propose a dead time compensation method, in which the compensation voltage is relative to the current distortion by applying a bias current. This adaptive compensation voltage is added onto the command voltage by adjusting PWM duty according to the current phase angle. As a result, the current distortion is compensated in feedback and presents good performance and high robustness.

It is therefore another object of this invention to propose an apparatus and a method for compensating dead time effects in inverters or converters having one or more legs with two complementary switches. The method of the invention mainly includes the following steps providing a pulse width modulation (PWM) reference, detecting the crossing points of the output current through a predetermined bias value, providing a dead time compensation signal which is adjusted in response to the crossing points, and adding the dead time compensation signal to the PWM reference. Hence an adaptive compensation is accomplished independent of types of switching elements and load conditions. A high reliable circuit with low cost can be provided as a preferred embodiment of bias current crossing points detection.

In this invention, the presented compensation method is intentionally features the following aspects. The bias current crossing points are detected instead of zero crossing points of the output current as in the prior all. The point in time of the polarity change in the dead time compensation signal is auto-adjusted in response to the detected bias current crossing points and is essentially asynchronous with reference to zero crossing points of the output current feedback or the output current reference. The dead time compensation signal is adjusted instantly in response to the detected bias current crossing points and the shape of it deviates from original compensation signal. The shape of the original compensation signal is an approximately periodical waveform of broken line with a gap around the zero crossing point of the output current. The point in time of the polarity change in the dead time compensation signal is in advance of that of the output current. The compensation signal is continuously varied from negative to positive or vice versa, while the slope ratio may be altered instantly in response to the detected bias current crossing points. The bias current crossing point is detected in the following steps: injecting a bias current from a simple circuit into the output terminal during the interval that the output terminal is connected to ground of DC bus, sampling the terminal voltage during this interval, and comparing the sampled voltage to a predetermined value. Finally, the point in time of logic level change in the comparison output signal indicates the bias current crossing point.

According to the aspect of the present invention, the method for compensating a dead time effect in an electronic appliance, includes the steps of: providing a pulse width modulation (PWM) reference, providing a first dead time compensation signal based on the pulse width modulation reference, detecting a bias current crossing point that is an output current passing through a predetermined bias level, generating a second dead time compensation signal instead of the first dead time compensation signal instantly in response to the detected bias current crossing point, and adding the second dead time compensation signal to the pulse width modulation reference.

Certainly, the electronic appliance is selected from the group consisting of an inverter and a converter.

Certainly, the dead time effect is selected from the group consisting of an output voltage error and a current distortion.

Preferably, a crossing point of polarity change in the second dead time compensation signal is auto-adjusted in response to the bias current crossing point and shifted in accordance with a near zero crossing point of an output current unless the system comes into a steady state.

Preferably, a shape of the second dead time compensation signal is auto-adjusted in response to the bias current crossing point and deviated from the first dead time compensation signal unless the system comes into a steady state.

Preferably, either the first dead time compensation signal or the second dead time compensation signal is continuously varied from negative to positive or vice versa, while the slope ratio is altered instantly in response to the bias current crossing point unless the system comes into a steady state.

Preferably, the crossing point of polarity change in either the first dead time compensation signal or the second dead time compensation signal is shifted in time in accordance with a near zero crossing point of an output current.

Preferably, the shape of first dead time compensation signal is an approximately periodical waveform of broken line with a gap near a zero crossing point of an output current.

Preferably, the step of detecting the bias current crossing point further includes the following steps of injecting a bias current into an output terminal of an inverter/a converter during a interval, sampling a terminal voltage during the interval, and comparing the sampled voltage to a predetermined value to obtain a comparison output signal, wherein a point in time, logic level change of the comparison output signal, indicates the bias current crossing point.

Certainly, the bias current can be in a positive direction or in a negative direction.

Preferably, a simple circuit being employed for detecting bias current crossing point includes a diode with its cathode end connected to the output terminal of a leg in one of an inverter and a converter, a resistor with one end connected to an anode end of the diode and the other end connected to a DC power source, wherein the value of the resistor equals to the result of dividing an amplitude of the DC power source by a value of the predetermined bias current, a comparator with one of its input ends connected to the anode end of the diode and the other input end connected to a predetermined potential, and a sampler with its input end connected to an output end of the comparator, wherein a sampling action is enabled during a interval that the output terminal of an inverter/a converter is connected to a ground of a DC bus therein.

Preferably, the step of adjusting the first dead time compensation signal further includes the following steps of detecting the initial output current direction signal, recording a period of the output current being positive or negative, and the output current cycle, calculating the average between the period of the output current being positive or negative, and extending a narrower period of the output current being positive or negative by a same width to its both sides, and compressing the wider period of the output current being positive or negative by the same width to its both sides for the purpose of making these two periods of the output current being substantially equal.

Preferably, the method of calculating the period of the current being positive or negative is carried out in terms of phase angle, or in terms of time.

The present invention may best be understood through the following description with reference to the accompanying drawings, in which:

DETAILED DESCRIPTION OF THE PREFERRED EMBODIMENT

Although this invention is susceptible to embodiments of many different forms, some preferred embodiments would be described and illustrated in detail hereinafter. The present disclosure exemplifies the principle of the invention and is not to be considered a limitation to the broader aspects of the invention to the particular embodiment as described.

Figure 1:
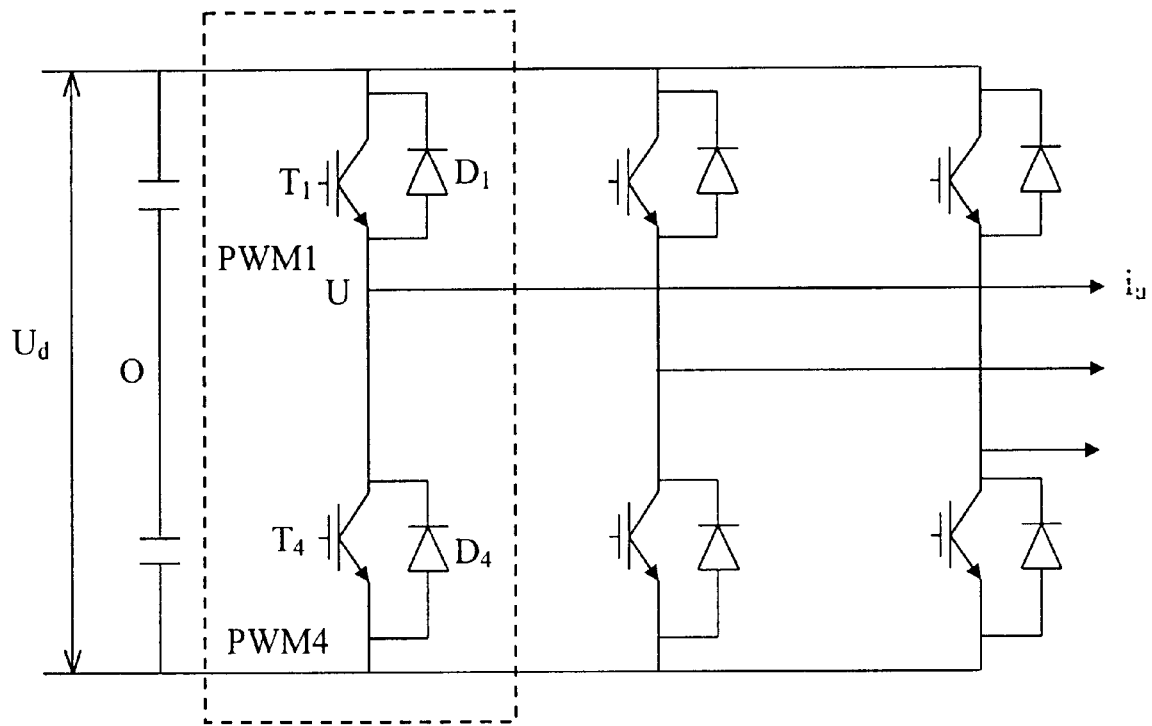
FIG. 1 illustrates a circuit configuration of an inverter according to the prior art.
Figure 2:
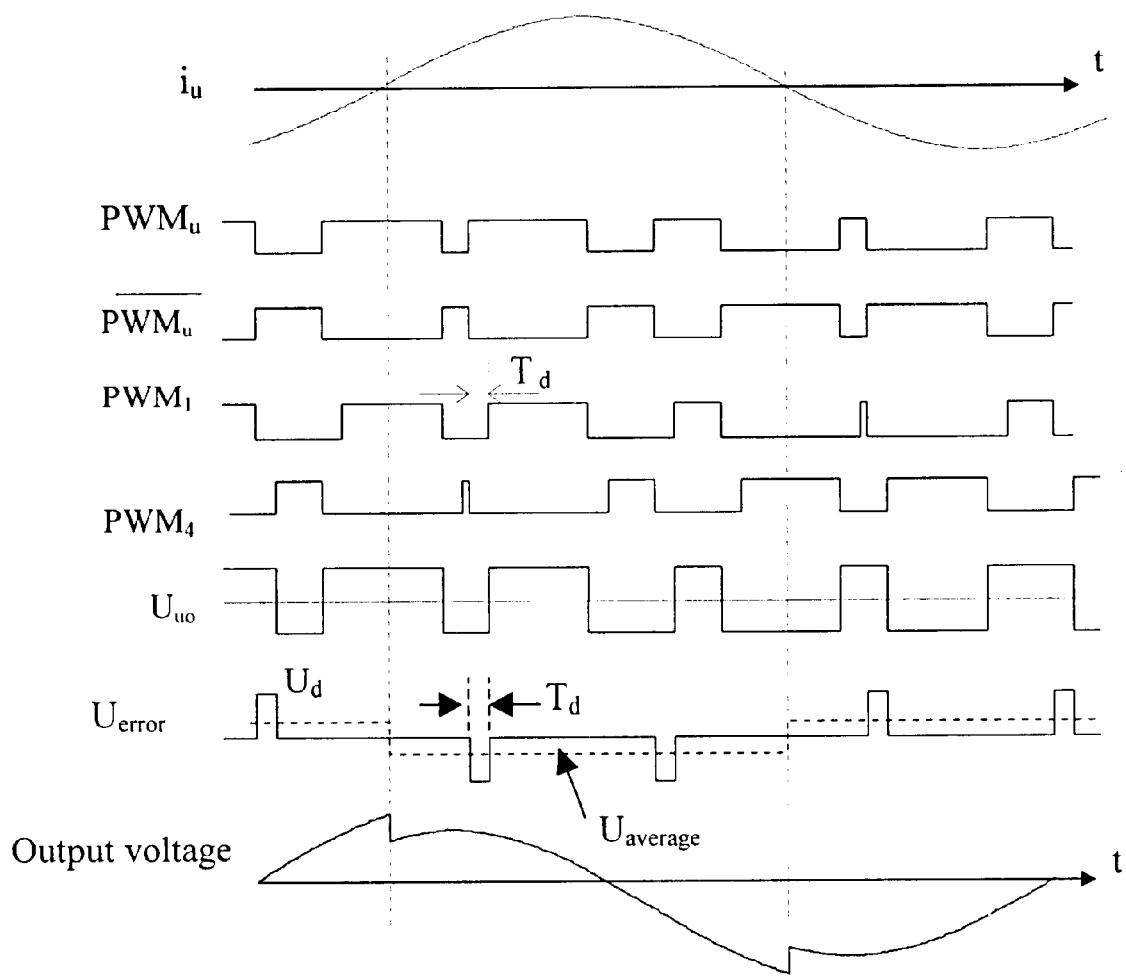
FIG. 2 illustrates the effect of dead time on an output voltage under the situation of delay time of switching elements not to be considered according to the prior art.
Figure 3:
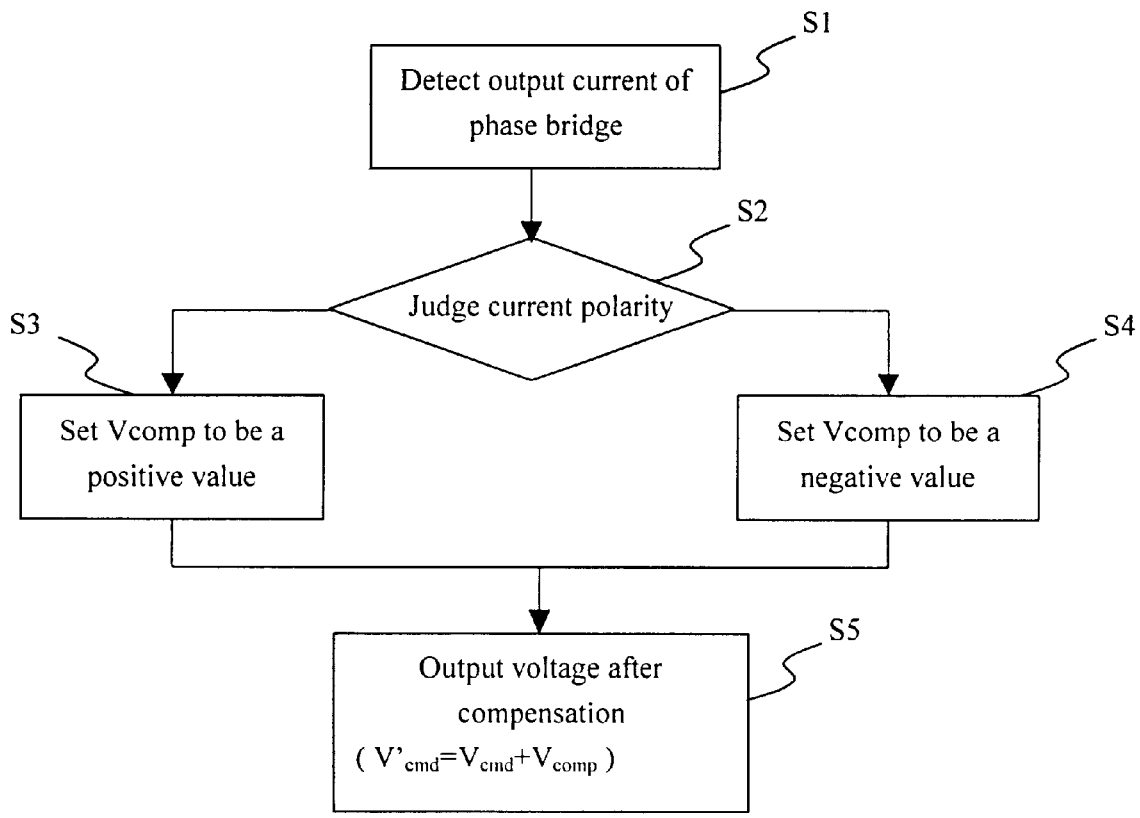
FIG. 3 shows a flowchart for compensating the voltage error in accordance with dead time according to the prior art.
Figure 4:
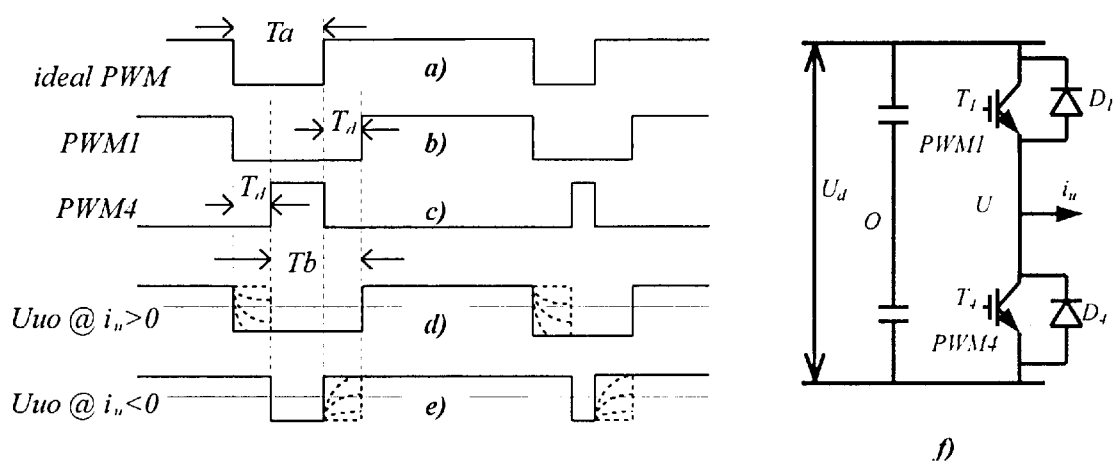
FIG. 4 shows the deviation voltage caused by delay time variation when the output current is small according to the prior art.
Figure 5:
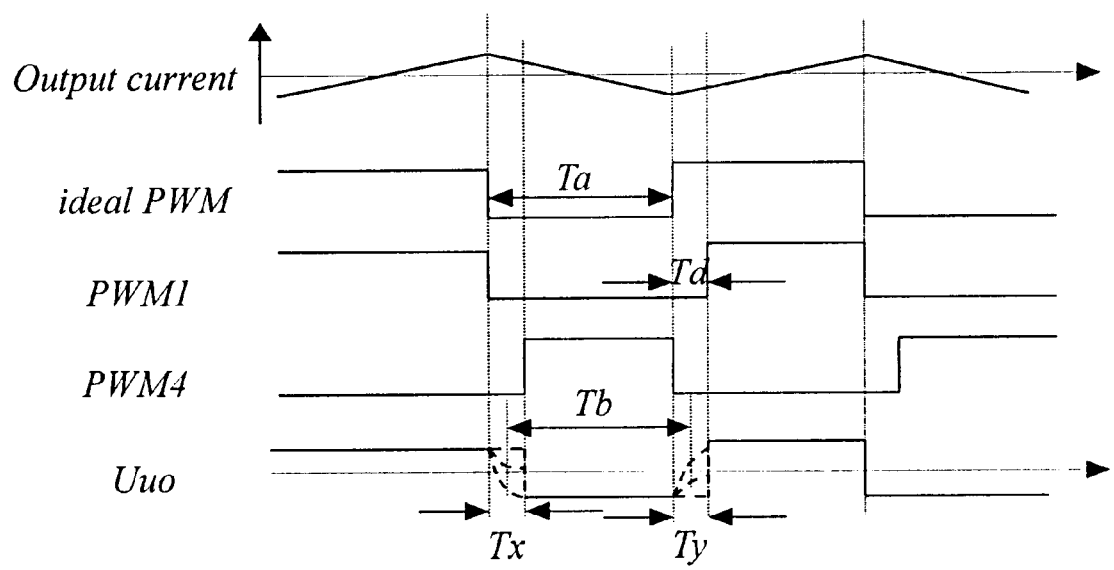
FIG. 5 shows the deviation voltage caused by delay time variation when the output current direction changes in one PWM cycle according to the prior art.
Figure 6:
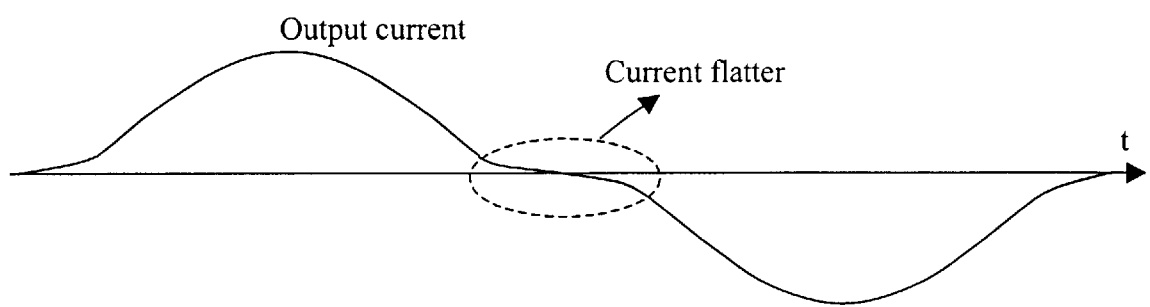
FIG. 6 shows the current flatter caused by delay time variation according to the prior art.
Figure 7:
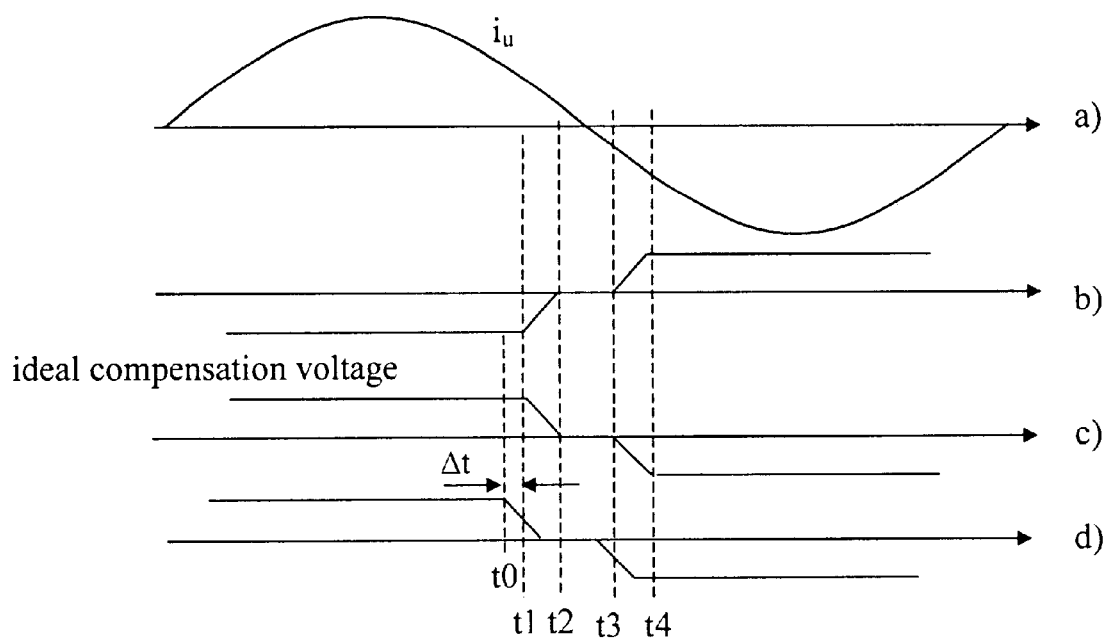
FIG. 7 shows the relationship between the deviation voltage caused by the delay time variation and the compensation voltage.

As described above, the voltage deviation caused by dead time is in the opposite direction to the output current, and its magnitude depends on the output current direction. For simplicity, it is abstracted to be in the shape of trapezoidal as illustrated in FIG. 7. As shown in FIG. 7, in the period of time between t2 and t3, the delay time is large enough to compensate the dead time automatically, and in the period of time between t1 and t2 and between t3 and t4, the delay time gradually increases and the dead time is partly compensated automatically. To counteract this deviation voltage, a reverse voltage as illustrated in part c) is required to be added onto the output voltage. Unfortunately, it is too complicated to be put into use directly. The reason lies in that it is difficult to detect the instants from which the output current approaches to the conditions that the delay time begins to go into or out of domination when the drive system is operating. In this invention, an advanced or the lead gappy shaped compensation voltage is applied to overcome the problem as illustrated in part d). It can be seen that the instant t0, which is the break point (or the inflection point) of the compensation voltage, time advance Δt to the break point of the deviation voltage caused by dead time.

Figure 8:
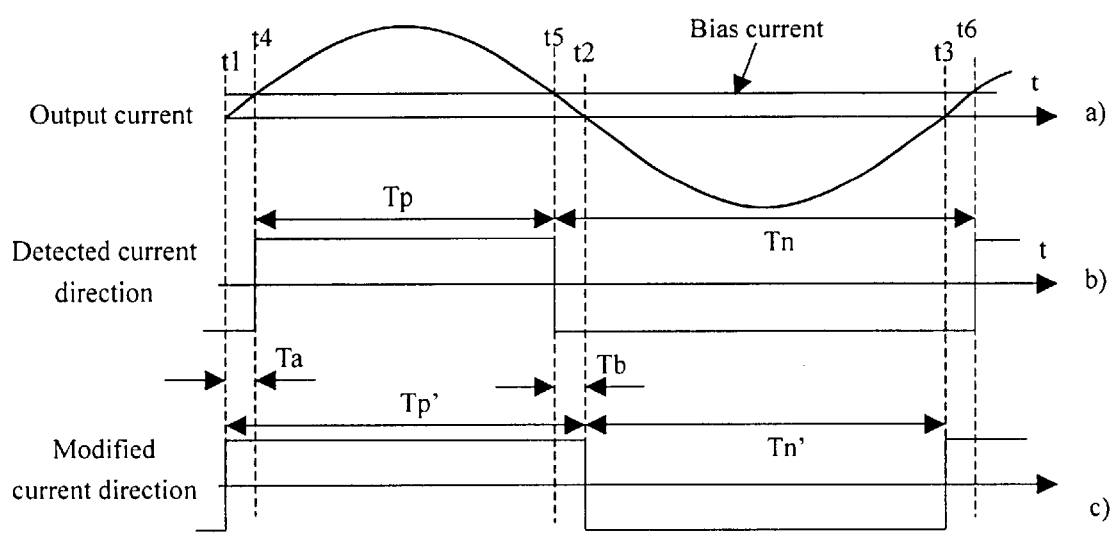
FIG. 8 shows the output current direction modification of the preferred embodiment when the output current is symmetric.

Referring to FIG. 8, time instants t1, t2 and t3 are the actual current ZCPs. As described above, it is difficult or high-cost to detect these time instants accurately. Besides, for the presence of current flatter around ZCPs, a little error on the current magnitude corresponds to a relatively large phase angle. As a result, a little error on the current magnitude will lead to a relatively much mistake compensation operation. In this invention, a bias current is added onto the current detection circuit and the corresponding detected ZCPs happen at the instants t4, t5 and t6. Obviously, the detected current direction signal is not symmetric. In other words, it is not of 50% duty even though the output current is an ideal sinusoidal waveform. This situation is illustrated in part b), where in the period of time Tp the output current is positive, and in the period of time Tn the current is negative. Referring to part c), the current direction signal is modified in the way of extending the period of time Tp by Ta to its front side and Tb to its end side, where Ta and Tb follows the equation:

$$Ta=Tb=|Tn-Tp|/4 \quad (1)$$

It can be seen that the current direction signal is symmetric, that is Tp'=Tn', and the modified current zero crossing point signal indicates the actual ZCP accurately.

Figure 9:
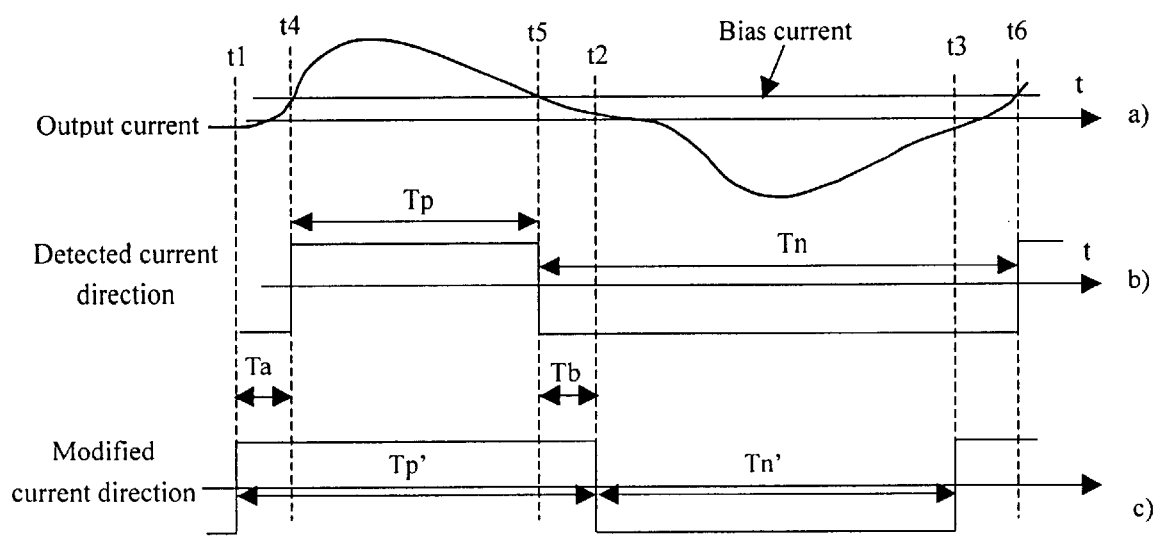
FIG. 9 shows the output current direction modification of the preferred embodiment when the output current is not symmetric for the reason of a too lag compensation voltage.

Above description is made under the assumption that current is symmetric, however, when this assumption is not meted, the bias current technique can adjust the current to be in symmetry. In other words, the current distortion can be eliminated. FIG. 9 shows a situation of the output current, where the distortion is caused for the reason of a too lag compensation voltage. When the bias current is employed, the corresponding detected ZCP signals happen at the instants t4, t5 and t6. This detected current direction signal is modified according to equation (1) and the modified ZCP signal is illustrated in part c). This signal is not synchronous with actual current and the break point of compensation voltage is introduced more advance to the distortion voltage accordingly. As a result, the output current tends to be symmetric and the distortion can be greatly minimized.

Figure 10:
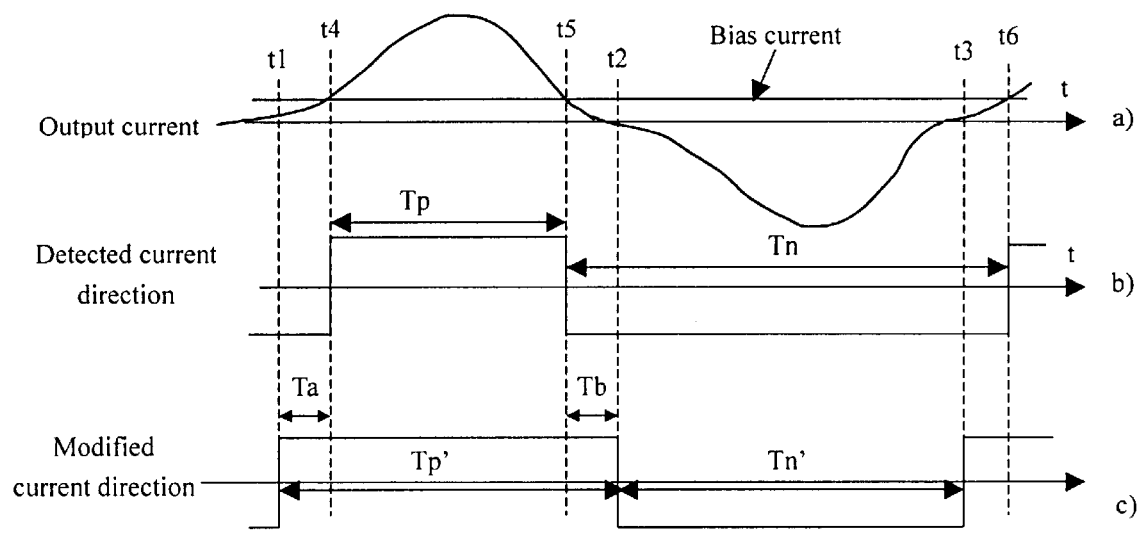
FIG. 10 shows the output current direction modification of the preferred embodiment when the output current is not symmetric for the reason of a too lead compensation voltage.

When the output current is in the shape as illustrated in FIG. 10, with the bias current employed and the ZCP signal modified as described above, the modified ZCPs take place in the instants of t1, t2 and t3. This means that the lead angle of the compensation voltage is shorted equivalently. As a result, the output current tends to be symmetric and the distortion can be greatly minimized.

Therefore, with the bias current method employed, the break point of compensation voltage is adjusted according to the current waveform to compensate the distortion. Furthermore, the problem caused by different types of switching elements and imprecision of the current direction signal can be overcome in a feedback manner.

Figure 11:
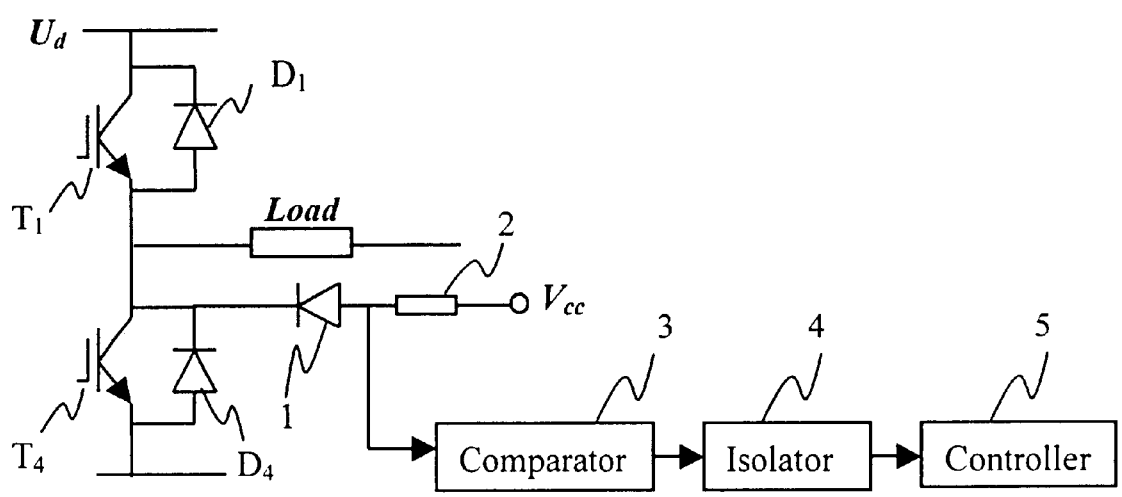
FIG. 11 shows the preferred embodiment of an output current direction detecting and bias current injection circuit of the present invention.
Figure 12:
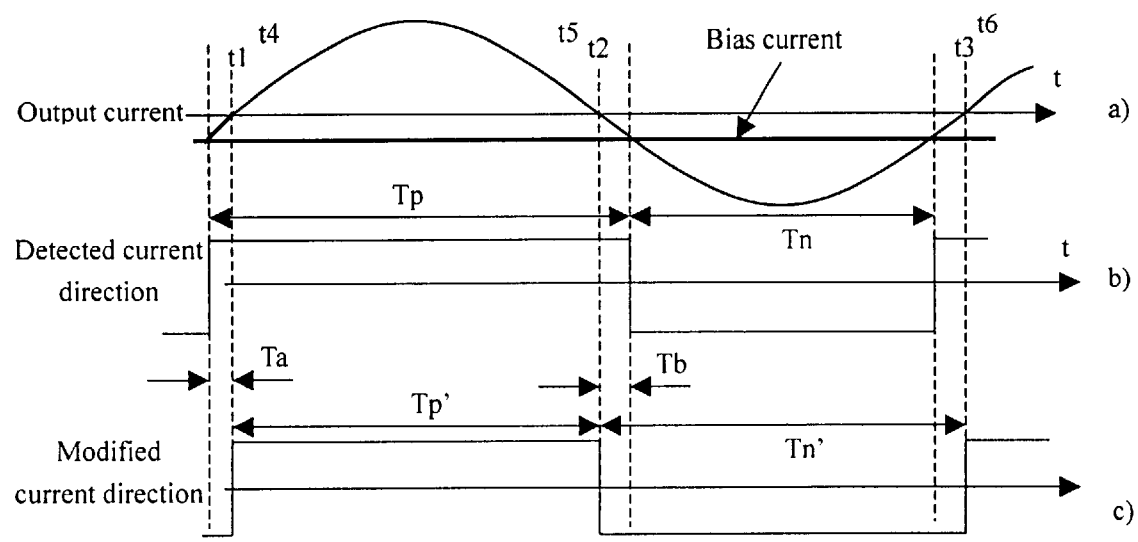
FIG. 12 shows another preferred embodiment that bias current is in negative direction.

A preferred embodiment of this invention is showed in FIG. 11, for the simplicity, only one phase of an inverter or a converter is illustrated. In the figure, the current direction is detected by means of the circuit, which consists of a diode 1, a resistor 2 and a comparator 3. The bias current method is easily implemented by setting the resistor 2 to a proper value. For example, setting the resistor 2 to be 100Ω and assuming the power supply $V_{cc}$ at 15V, the bias current will be about 130 mA. The output of comparator 8 is isolated by means of the isolator 4 and transmitted to controller 5. The controller 5 samples the current direction signal and modifies the original current direction signal instantly in the rule of equation (1) to generate the adaptive instant at which point the break point of compensation voltage is introduced. Consequently, the controller 10 adds the output the gappy shaped compensation voltage to the command voltage according to the modified current direction signal by extending or narrowing the PWM command signal, and outputs a new PWM command signal.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method for compensating a dead time effect in an electronic appliance comprising the steps of:
   providing a pulse width modulation (PWM) reference;
   providing a first dead time compensation signal based on said pulse width modulation reference;
   detecting a bias current crossing point that is an output current passing through a predetermined bias level;
   generating a second dead time compensation signal instead of said first dead time compensation signal instantly in response to said detected bias current crossing point; and
   adding said second dead time compensation signal to said pulse width modulation reference.

2. The method according to claim 1, wherein said electronic appliance is one of an inverter and a converter.

3. The method according to claim 1, wherein said dead time effect is one of an output voltage error and a current distortion.

4. The method according to claim 1, wherein a crossing point of polarity change in said second dead time compensation signal is auto-adjusted in response to said bias current crossing point and shifted in accordance with a near zero crossing point of said output current unless the system comes into a steady state.

5. The method according to claim 1, wherein a shape of said second dead time compensation signal is auto-adjusted in response to said bias current crossing point and deviated from said first dead time compensation signal unless the system comes into a steady state.

6. The method according to claim 1, wherein one of said first dead time compensation signal and said second dead time compensation signal is continuously varied from negative to positive, while a slope ratio thereof is altered instantly in response to said bias current crossing point unless the system comes into a steady state.

7. The method according to claim 1, wherein either said first dead time compensation signal or said second dead time compensation signal is continuously varied vice versa, while the slope ratio is altered instantly in response to said bias current crossing point unless the system comes into a steady state.

8. The method according to claim 1, wherein a crossing point of polarity change in one of said first dead time compensation signal and said second dead time compensation signal is shifted in time in accordance with a near zero crossing point of said output current.

9. The method according to claim 1, wherein a shape of said first dead time compensation signal is an approximately periodical waveform of broken line with a gap near a zero crossing point of said output current.

10. The method according to claim 1, wherein the step of detecting said bias current crossing point further comprises the following steps of:
    injecting a bias current into an output terminal of said electronic appliance during an interval;
    sampling a terminal voltage during said interval; and
    comparing said sampled voltage to a predetermined value to obtain comparison output signal, wherein a point in time, logic level change of said comparison output signal, indicates said bias current crossing point.

11. The method according to claim 10, wherein said bias current is in one of a positive direction and a negative direction.

12. The method according to claim 2, wherein a simple circuit being employed for detecting said bias current crossing point comprises:
    a diode with its cathode end connected to the output terminal of a leg in one of said inverter and said converter;

a resistor with one end connected to an anode end of said diode and the other end connected to a DC power source, wherein a value of said resistor equals to the result of dividing an amplitude of said DC power source by a value of said predetermined bias current;

a comparator with one of its input ends connected to said anode end of said diode and the other input end connected to a predetermined potential; and a sampler with its input end connected to an output end of said comparator, wherein a sampling action is enabled during an interval that said output terminal of one of said inverter and said converter is connected to a ground of a DC bus therein.

13. The method according to claim 1, wherein the step of adjusting said first dead time compensation signal further comprises the following steps of:

detecting an initial output current direction signal;

recording a period of polarities of said output current and the current cycle;

calculating an average of said period of said output current; and extending a narrower period of said output current by a same width to its both sides, and compressing the wider period of said output current by said same width to its both sides for the purpose of making these two periods of said output current being substantially equal.

14. The method according to claim 13, wherein the method of calculating said period of said output current is carried out in terms of one of a phase angle and time.

* * * * *